United States Patent [19]

Mayer et al.

[11] Patent Number: 4,590,852
[45] Date of Patent: May 27, 1986

[54] COOLING SYSTEM FOR APPARATUS FOR PROCESSING FROZEN COMESTIBLES

[75] Inventors: David Mayer, Scarsdale, N.Y.; James F. Hall, Jr., Ardsley, Pa.

[73] Assignee: Orange Julius International Inc., New York, N.Y.

[21] Appl. No.: 584,528

[22] Filed: Feb. 28, 1984

[51] Int. Cl.⁴ .......................... A23G 9/02; A23G 9/12
[52] U.S. Cl. ........................................ 99/455; 62/256; 99/452; 366/144; 366/318
[58] Field of Search ................. 99/348, 452, 494, 460, 99/516, 517; 426/518, 519; 425/206–209, 151, 200, 135, 182; 366/206, 140, 142, 247, 323, 194–196, 318; 222/413; 241/282.1; 62/256, 342, 404, 407, 409, 426

[56] References Cited

U.S. PATENT DOCUMENTS

| | | | |
|---|---|---|---|
| 2,332,174 | 10/1943 | Shreve | 62/256 |
| 2,421,314 | 5/1947 | Brinkoeter | 62/256 |
| 4,448,114 | 5/1984 | Mayer | 366/142 X |

Primary Examiner—Timothy F. Simone
Attorney, Agent, or Firm—Auslander & Thomas

[57] ABSTRACT

The present invention is a method and apparatus for cooling a frozen comestible plasticizer apparatus with a heat exchanger pan over a freezer, protecting the freezer from extraneous matter filling in, while providing a cool circulatable environment to cool the auger and cup of the apparatus to help avoid bacterial growth and minimize the need for cleaning of the apparatus.

4 Claims, 3 Drawing Figures

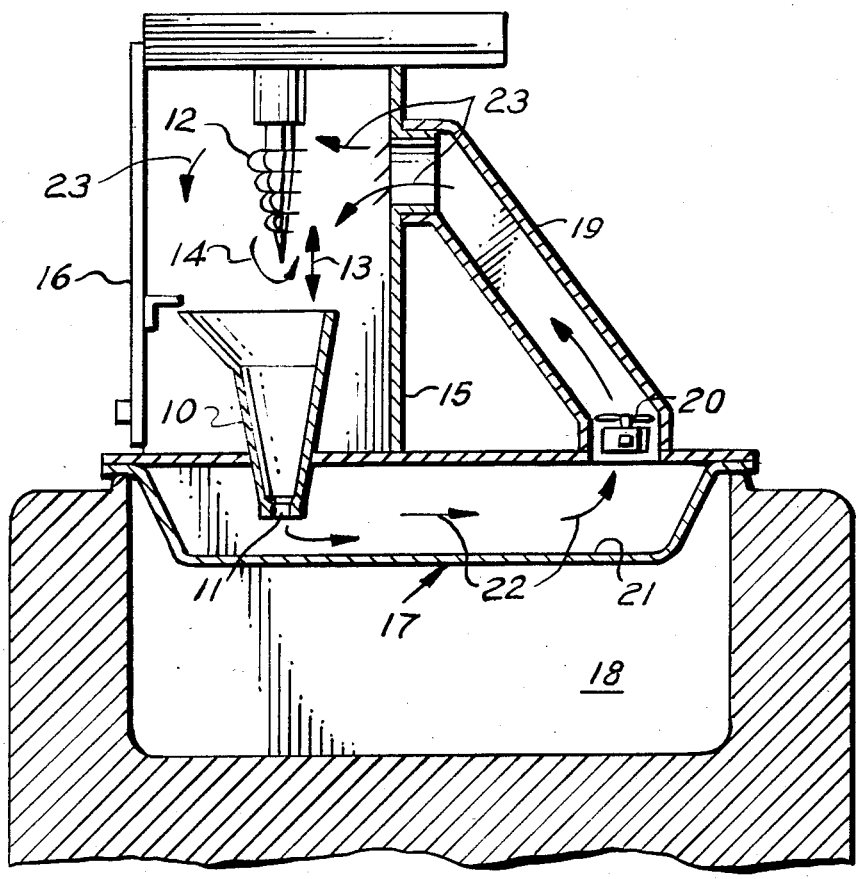
FIG.1
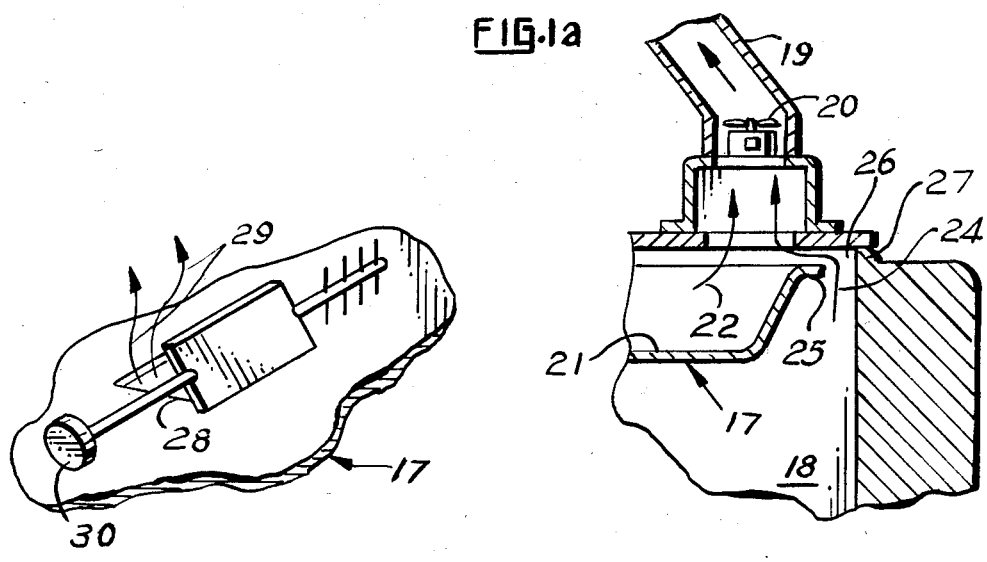
FIG.1a
FIG.1b

NEW COOLING SYSTEM FOR APPARATUS FOR PROCESSING FROZEN COMESTIBLES

The invention relates to cooling for the protection against bacterial growth and as an aid to processing of frozen comestibles in the mechanical working or plasticizing of a frozen dairy product, such as ice cream.

BACKGROUND OF THE INVENTION

Apparatus has been developed for the mechanical working or plasticizing of a hard frozen diary product, such as ice cream. The object of this apparatus is to restore to the frozen comestible, the natural soft, creamy texture that normally accompanies freshly made ice cream, or ice cream custard and to maintain a cool environment to protect against bacterial growth and reduce necessary cleanings of the apparatus. Such an apparatus is disclosed in U.S. Pat. Nos. 2,409,067; 2,676,132; 2,676,133; 3,061,279 and Ser. No. 478,219 filed the 24th day of March, 1983; the description thereof desired to be incorporated herein by way of reference.

The above-mentioned apparatus comprises an auger that mechanically works or mixes the frozen dairy product until a smooth, creamy texture is obtained. During this mixing, a certain amount of heat is generated through mechanical action. This heat has been known to sometimes cause an undesirable watery consistency in the final product and encourages its growth of bacteria.

It is also observed, that on hot summer days, the apparatus can quickly warm up if left standing even for short periods of time. There is the possibility of spoilage and bacterial growth which necessitates labor cost and down time for cleaning of the apparatus. Thus, for example, microorganisms, such as psychrophiles, are known to be capable of growth even at 0° C., and exhibit a high growth characteristic in the mesophilic range, i.e., temperatures between 10° and 47° C. It is therefore desirable to maintain a working environment as cool as possible.

While most dairy products have been pasteurized to destroy harmful bacteria, not all bacteria is destroyed, and other bacteria can enter the comestible during the storage, handling and shipping thereof.

Therefore, it has been determined that the aforementioned processing apparatus should have new means to maintain it at as cool a temperature as possible.

BASIC SUMMARY OF THE INVENTION

Generally speaking, the present invention relates to an improved apparatus and method for cooling a plasticizing apparatus for frozen comestibles. The improvement features means to keep the apparatus and comestible in the apparatus in a cool environment while it is being mixed or extruded, or when used apparatus is left to stand.

The frame or housing of the apparatus is generally positioned over a freeze area or freezer compartment. The apparatus is provided with a pan that traps the cold air within the freezer compartment. The pan that traps the cold air within the freezer compartment, is consequently cooled thereby.

An air duct attached to the frame of the processing apparatus, the subject matter of U.S. patent application Ser. No. 547,331 filed Oct. 31, 1983, circulates the cold air surrounding the pan and circulates this cooled air past the auger and the comestible receptacle. The subject matter of said U.S. patent application is incorporated herein by reference.

A fan disposed within the duct creates a continuous circulation, such that the apparatus is kept cool even while standing for long periods of time.

In an alternate embodiment of the invention, the pan is designed to fit only partially over the mouth of the freezer, freezer area or freezer compartment, thus allowing more colder, freezer generated air to rise above the pan and be circulated through the apparatus.

In a further embodiment, the pan is provided with a louvre or air-valve that can selectively regulate or control the amount of freezer generated air that flows above the pan, and subsequently is circulated through the apparatus.

It is an object of this invention to provide an apparatus and method for maintaining a frozen comestible in a comestible processing unit at a cool temperature, such that bacterial growth is inhibited and the comestible is prevented from becoming watery, soft or spoiled, especially while being plasticized and extruded.

It is another object of this invention to provide a frozen comestible processor with means for continuously circulating cool air past the comestible and the parts of the apparatus to prevent or retard bacterial growth in said apparatus parts, particularly the cup and auger and in said comestible.

It is another object of this invention to provide a frozen comestible processor with a pan interposed between the apparatus and the freezer, thus preventing foreign matter or any discharge from the apparatus entering the freezer, which would necessitate additional cleaning and more difficult cleaning.

It is another object of this invention is to provide a pan to act as a heat exchanger to exchange heat from the freezer, which may then be circulated to cool the apparatus, particularly the receptacle and the auger.

Although such novel feature or features believed to be characteristic of the invention are pointed out in the claims, the invention and the manner in which it may be carried out may be further understood by reference to the description following and the accompanying drawings.

BRIEF DESCRIPTION OF THE DRAWINGS

FIG. 1 is a cut-away side view of the frozen comestible processing apparatus of this invention.

FIG. 1a is an alternate embodiment of part of the invention of FIG. 1, shown in a partial cut-away schematical view.

FIG. 1b is another alternate embodiment of part of the invention illustrated in FIG. 1, depicting a perspective, schematic, partial view.

DETAILED DESCRIPTION OF THE INVENTION

Referring now to the drawings wherein like reference numerals designate identical parts in the figures, a frozen comestible is deposited for processing in receptacle 10 of FIG. 1. The receptacle 10 has an aperture 11 in a bottom portion thereof, in which the comestible is extruded therethrough, when plasticized.

An auger 12 rotates, as shown by arrow 14. The receptacle 10 and auger 12 can move relatively toward and away from each other as depicted by arrow 13. The receptacle 10 preferably moves toward and away from the auger.

A frame or housing 15 supports the receptacle 10 and auger 12 for said relative movement.

A front sliding panel 16, is openable to allow a frozen comestible, such as frozen ice cream to be placed in receptacle 10.

The frame or housing 15 rests upon a pan 17, that is placed over the mouth or open portion of a freezer compartment 18, as shown in FIG. 1.

The frozen ice cream is plasticized or mechanically worked when the rotating auger 12 is forced to contact the frozen ice cream that is placed in the receptacle 10. The operation of this processing is more fully explained in the aforementioned referenced patents and applications, and forms no part of the current inventive improvement.

A duct 19 is supported by the frame 15 and in turn houses a fan 20.

The pan 17 further maintains sanitation by preventing comestible dripping into the freezer compartment 18. This also simplifies cleaning of the apparatus and the working area. The pan 17 further acts as an effective heat exchanger between the apparatus and freezer compartment 18.

The method of this invention comprises extracting at least a portion of cold air surrounding or generated by the freezer compartment 18, and then circulating the cold air past the auger and receptacle 10 and even the frozen comestible while it is deposited in the receptacle 10.

The above method is accomplished by means of the pan 17, which is allowed to grow cold by virtue of its contact and proximity to the freezer compartment 18. The surface 21 of the cold pan will cause air circulating past to be likewise chilled.

Air is caused to be circulated across the pan surface 21 (arrows 22) and is drawn by means of the fan 20 disposed in the duct 19.

The air flowing over the cold pan surface 21 is circulated by means of the fan 20 and drawn into the duct 19 from the pan surface 21, and is caused to flow over the auger 12, and into and around the receptacle 10, as depicted by arrows 23.

The air will be caused to continuously flow over, around and through the above-mentioned components, and will be recharged with the coldness permeating from the pan surface 21. In this way, a frozen comestible deposited in the receptacle 10, as well as the auger 12 and the surrounding apparatus, will be maintained at a cool temperature despite hot ambient surrounding air or the heat generated from the mixing process.

Referring to FIG. 1a, an alternate embodiment is shown for the pan 17. The pan 17 is made with a shortened lip 25, such that there is a gap 26 between the pan 17 and the lip 27 of the freezer compartment 18. As a consequence thereof, some cold air is allowed to escape from the freezer compartment, as depicted by arrow 24.

The air from the freezer compartment is generally colder than the air circulating past the pan surface 21, as depicted by arrow 22. The colder air from the freezer compartment 18 will thus mix with the pan surface air in duct 19, and will be circulated through the apparatus the same as before, as illustrated in FIG. 1. This results in a colder circulating stream of air past the apparatus components.

Referring to FIG. 1b, another embodiment is depicted for pan 17. Pan 17 is now shown having an aperture 28 through which freezer air may now escape, as illustrated by arrows 29. A rotatable louvre or valve 30 can be used to selectively regulate or control the amount of freezer compartment air flowing from aperture 23, thus controlling the ultimate circulating air temperature.

The terms and expressions which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. Apparatus for processing a frozen comestible said apparatus including a base; a housing; a receptacle for carrying said frozen comestible; an auger for rotatable engagement with said comestible while said comestible is carried by said receptacle; said housing adapted to be supported at its base atop an opening in a freezer chest; an opening in said base; said opening adapted to the free flow of air about said receptacle; air circulation means, said air circulation means including a duct and a fan, said duct open at one end through said base and at its other end opening adjacent said auger, and a pan interposed between said base and said freezer, substantially covering said freezer opening, said pan adapted to act as a heat exchanger, whereby the operation of said fan circulates cold air about said auger and said receptacle.

2. The apparatus of claim 1, wherein said pan substantially covers said freezer area.

3. The apparatus of claim 1, wherein said pan only partially covers said freezer area.

4. The apparatus of claim 1, wherein said pan includes means for regulating the amount of cold air supplied directly from said freezer area.

* * * * *